United States Patent
Kwon et al.

(10) Patent No.: US 11,009,128 B2
(45) Date of Patent: *May 18, 2021

(54) GEAR SHIFTING APPARATUS FOR MULTI-SPEED TRANSMISSION FOR ELECTRIC VEHICLES

(71) Applicants: HYUNDAI MOTOR COMPANY, Seoul (KR); KIA MOTORS CORPORATION, Seoul (KR)

(72) Inventors: Sun Sung Kwon, Anyang-si (KR); Soonki Eo, Ansan-si (KR); Ma Ru Kang, Yongin-si (KR); Minho Chae, Incheon (KR); Yong Uk Shin, Suwon-si (KR); Chon Ok Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 54 days.

This patent is subject to a terminal disclaimer.

(21) Appl. No.: 16/514,044

(22) Filed: Jul. 17, 2019

(65) Prior Publication Data
US 2020/0166130 A1 May 28, 2020

(30) Foreign Application Priority Data

Nov. 23, 2018 (KR) .......................... 10-2018-0146085

(51) Int. Cl.
*F16H 59/00* (2006.01)
*F16H 61/00* (2006.01)
(Continued)

(52) U.S. Cl.
CPC ............ *F16H 63/304* (2013.01); *B60T 1/005* (2013.01); *F16H 53/02* (2013.01); *F16H 53/06* (2013.01);
(Continued)

(58) Field of Classification Search
CPC .... F16H 63/3466; F16H 63/304; F16H 63/18; F16H 63/3433; F16H 61/32; F16H 63/32;
(Continued)

(56) References Cited

U.S. PATENT DOCUMENTS 6,725,962 B1 * 4/2004 Fukuda ................. F16D 63/006
180/292
9,242,623 B2 1/2016 Burgardt et al.
(Continued)

FOREIGN PATENT DOCUMENTS

DE 102015224285 A1 * 6/2017 ............. F16H 63/18
FR 2964925 A1 * 3/2012 ............. B60T 1/062

*Primary Examiner* — Jake Cook
(74) *Attorney, Agent, or Firm* — Brinks Gilson & Lione

(57) ABSTRACT

A gear shifting apparatus for a multi-speed transmission includes: a shifting unit controlling gear shifting by an actuator, and a parking unit controlling parking by the actuator. In particular, the actuator includes a control motor driving a driven gear through a drive gear externally gear-meshed with the driven gear, and the shifting and parking units are operated by a force received from a cam block fixed to the driven gear. The shifting unit includes a fork slider slidably mounted on a fork rail, a shift fork integrally formed with the fork slider, and a cam contact pin integrally formed with the fork slider and contacting the cam block.

13 Claims, 4 Drawing Sheets

Figure 1:
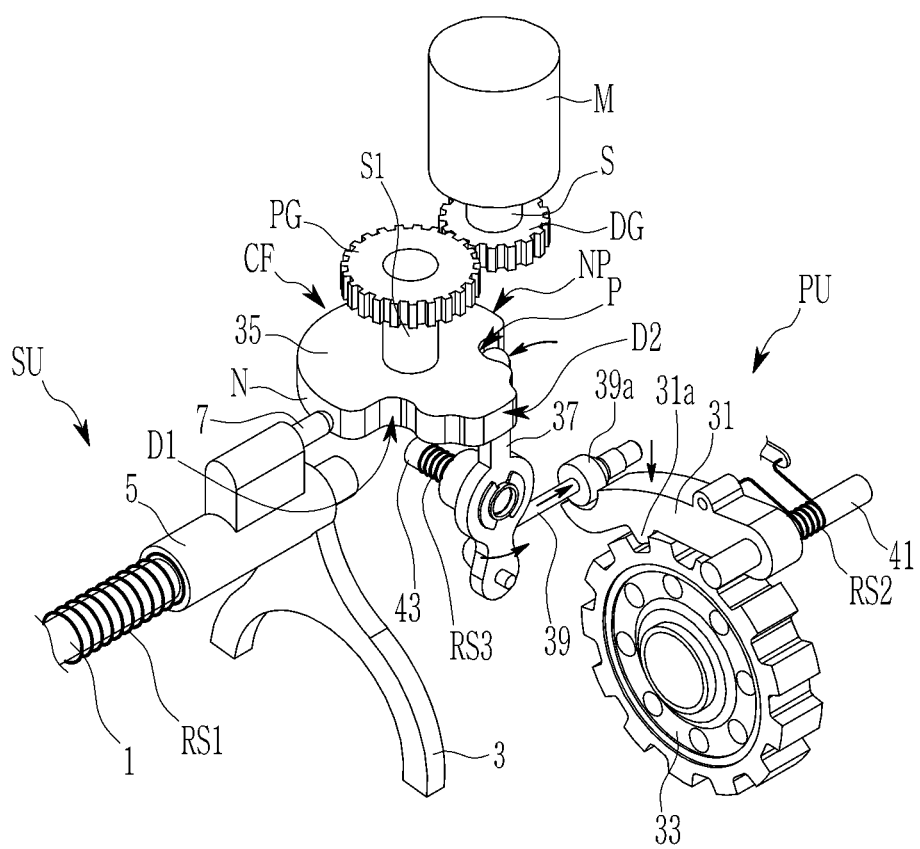

(51) Int. Cl.
*F16H 63/00* (2006.01)
*F16H 63/30* (2006.01)
*B60T 1/00* (2006.01)
*F16H 53/02* (2006.01)
*F16H 53/06* (2006.01)
*F16H 63/18* (2006.01)
*F16H 63/32* (2006.01)
*F16H 63/34* (2006.01)

(52) U.S. Cl.
CPC ............. *F16H 63/18* (2013.01); *F16H 63/32* (2013.01); *F16H 63/3425* (2013.01); *F16H 2063/3056* (2013.01); *F16H 2063/321* (2013.01)

(58) Field of Classification Search
CPC ....... F16H 2063/321; F16H 2063/3056; F16H 63/3425; F16D 63/006; B60T 1/005
See application file for complete search history.

(56) References Cited

U.S. PATENT DOCUMENTS

| | | | |
|---|---|---|---|
| 9,709,131 B2* | 7/2017 | Ikemoto | F16H 3/006 |
| 2007/0272511 A1* | 11/2007 | Saitoh | F16H 63/3416 |
| | | | 192/219.5 |
| 2009/0173594 A1* | 7/2009 | Joshi | F16H 63/3416 |
| | | | 192/219.5 |
| 2018/0038480 A1* | 2/2018 | Scalici | F16H 63/3466 |

* cited by examiner

GEAR SHIFTING APPARATUS FOR MULTI-SPEED TRANSMISSION FOR ELECTRIC VEHICLES

CROSS-REFERENCE TO RELATED APPLICATION

This application claims priority to and the benefit of Korean Patent Application No. 10-2018-0146085, filed on Nov. 23, 2018, the entire contents of which are incorporated herein by reference.

FIELD

The present disclosure relates to a gear shifting apparatus for multi-speed transmission for electric vehicles.

BACKGROUND

The statements in this section merely provide background information related to the present disclosure and may not constitute prior art.

An automated manual transmission (AMT), a dual clutch transmission (DCT), or a multi-speed transmission for an electric vehicle is typically employed to automatically shift gears with a gear arrangement similar to as the gear arrangement of a conventional manual transmission. Such a transmission is typically provided with a parking actuator for an automated parking, as well as a shifting actuator to automatically shift gears.

A multi-speed transmission of an electric vehicle typically employs a shift-by-wire scheme, where shifting is electronically controlled based on driver's input signal generated by a driver's operation of a shift lever or a shift button. Since an electric vehicle may practically realize a continuously variable shifting by controlling an output power of a drive motor, shift-stages more than two shift stages are not typically required. Thus, a shifting unit installed in such an electric vehicle utilizes only one or two shift forks.

The multi-speed transmission of an electric vehicle employs at least one control motor as a shifting actuator for realizing the gear shifting between the available shift-stages. In addition, another control motor is separately employed as a parking actuator to control a parking sprag for engaging and releasing a parking gear.

We have discovered that separated control motors (i.e., one control motor for a shifting unit for gear-shifting, and another control motor for a parking unit for engaging and releasing a parking gear) may result in structural complication of a multi-speed transmission, an increase in a production cost due to increased number of required parts, and an increase of a vehicle weight.

The above information disclosed in this Background section is only for enhancement of understanding of the background of the present disclosure and therefore it may contain information that does not form the prior art that is already known to a person of ordinary skill in the art.

SUMMARY

The present disclosure has been made in an effort to provide a gear shifting apparatus for a multi-speed transmission for an electric vehicle having advantages of realizing both the shifting function and the parking function by a control motor, enabling control of first and second shift-stages and a parking stage, thereby achieving simplification of structure, cost reduction due to less number of required parts, and weight reduction.

A shifting unit controlling gear shifting through a shift fork mounted on a fork rail by a torque of an actuator may include: a shifting unit controlling gear shifting by a torque of an actuator, and a parking unit controlling a parking state by the torque of the actuator. The actuator may include: a control motor transmitting a driving torque to a driven gear through a drive gear externally gear-meshed with the driven gear. The shifting unit and the parking unit may be operated by a force received from a cam block fixed with the driven gear at a rotation center. The shifting unit may include a fork slider slidably mounted on a fork rail, a shift fork integrally formed with the fork slider and activating the gear shifting, and a cam contact pin integrally formed with the fork slider and contacting the cam block.

The parking unit may include: a parking gear, a parking sprag that has an engagement end facing the parking gear, rotates about an axis of a sprag shaft, and abuts toward a parking release direction; a parking lever rotatably mounted on a lever shaft and abutted to maintain contact with a cam surface formed on an exterior circumference of the cam block; and a parking rod connected to a bottom portion of the parking lever and having a cam portion interacting with an end of the parking sprag distal to the sprag shaft.

A speed reduction may be achieved when the torque of the control motor is transmitted from the drive gear to the driven gear.

The cam surface may be formed along an exterior circumference of the cam block. The cam may include: a neutral range, a first shift-stage range, and a second shift-stage range, which are operable with the shifting unit, and the cam may further include a parking range and a parking release range, which are operable with the parking unit.

The cam surface may be formed in a profile such that the parking unit stays in the parking range while the shifting unit stays in the neutral range, and the parking unit stays in the parking release range while the shifting unit stays in the first shift-stage range or the second shift-stage range.

The parking lever the parking lever may rotate at an axis of the lever shaft and thereby horizontally operates the parking rod.

The cam portion of the parking rod may press the end of the parking sprag to force the engagement end of the sprag to engage with the parking gear.

A multi-speed transmission of an electric vehicle of an exemplary form of the present disclosure realizes both the shifting function and the parking function by a control motor while maintaining control reliability, thereby realizing simplification of structure, a cost reduction due to decreased number of required parts, and a weight reduction.

Further areas of applicability will become apparent from the description provided herein. It should be understood that the description and specific examples are intended for purposes of illustration only and are not intended to limit the scope of the present disclosure.

DRAWINGS

Figure 2:
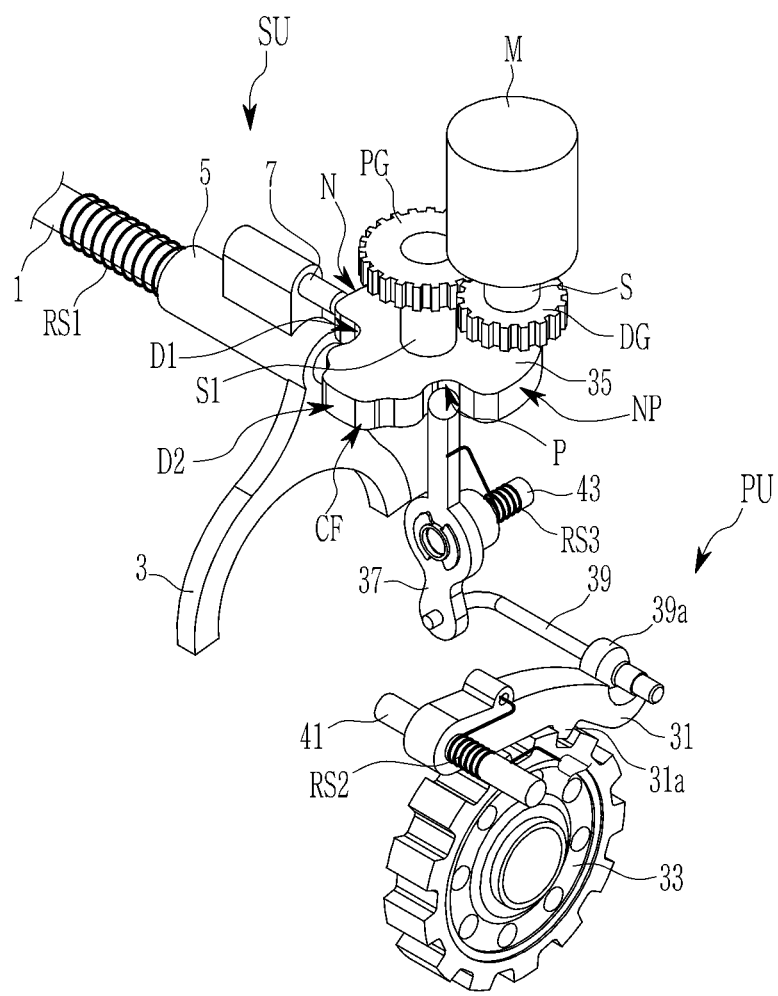
Figure 3:
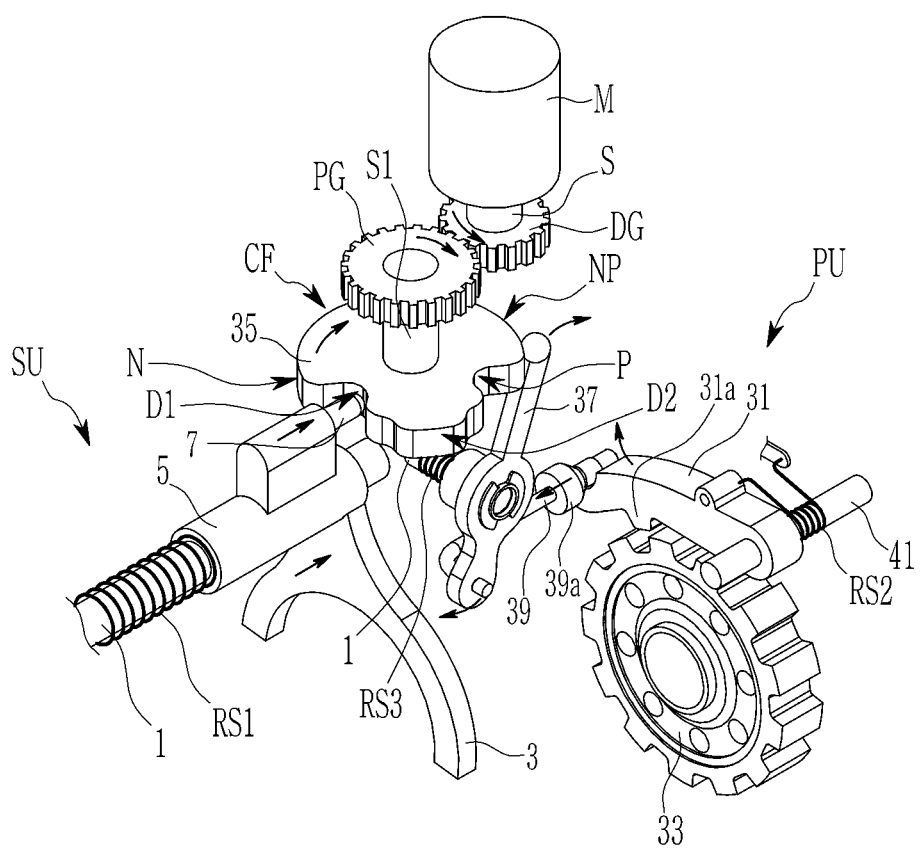
Figure 4:
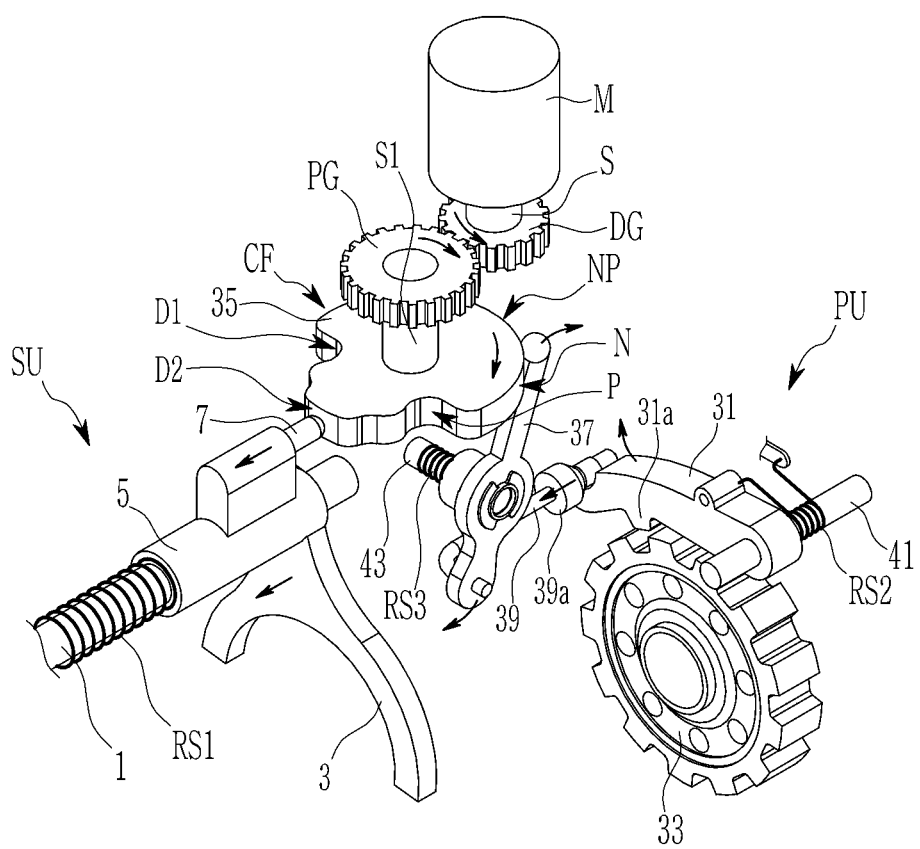

In order that the disclosure may be well understood, there will now be described various forms thereof, given by way of example, reference being made to the accompanying drawings, in which:

FIG. 1 and FIG. 2 are schematic perspective views respectively illustrating a gear shifting apparatus for a multi-speed transmission for an electric vehicle according to an exemplary form of the present disclosure; and FIG. 3 to FIG. 4 respectively illustrate an operation state of a gear shifting apparatus for a multi-speed transmission for an electric vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The size and the thickness of each component illustrated in the drawings are arbitrarily illustrated in the drawings for better understanding and ease of description, but the present disclosure is not limited to the illustration. In the drawings, the thicknesses of various portions and regions are enlarged for clarity.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

For convenience of description of an exemplary form of the present disclosure, directions are described as left and right with a mere reference to FIG. 1, and may be understood that such direction is intrinsic to an actual apparatus.

FIG. 1 and FIG. 2 are schematic perspective views respectively illustrating a gear shifting apparatus for a multi-speed transmission for an electric vehicle according to an exemplary form of the present disclosure.

A gear shifting apparatus according to an exemplary form of the present disclosure is described with reference to an example of a two-staged transmission of an electric vehicle.

It should be noted that a gear shifting apparatus according to an exemplary form of the present disclosure may be applied to a transmission other than a two-staged transmission. In this case, an additional shifting unit and/or an additional control motor may be employed for further number of shift-stages.

Referring to FIG. 1 and FIG. 2, the gear shifting apparatus includes: an actuator, a cam block 35 transmitting a torque of the actuator through a cam surface, a shifting unit SU that receives a torque from the cam block 35 and controls gear shifting through a shift fork 3 installed on a fork rail 1, and a parking unit PU receiving a torque from the cam block 35 and controlling engagement and disengagement of a parking gear 33 through a parking sprag 31.

The actuator includes a control motor M driving a drive gear DG externally gear-meshed with a driven gear PG of the shifting unit SU and the parking unit PU.

The shifting unit SU and the parking unit PU convert the torque of the control motor M to horizontal forces to operate of the shift fork 3 and the parking sprag 31.

The drive gear DG is mounted on a rotation shaft S of the control motor M.

A cam surface CF is formed on an exterior circumference of the cam block 35, and is connected to a camshaft S1 forming a rotation center of the driven gear PG externally engaged with the drive gear DG.

The drive gear DG and the driven gear PG form a reduction gear ratio such that a speed reduction is realized when the torque of the control motor M is transmitted to the cam block 35.

The cam block 35 converts the torque of the control motor M to a horizontal force through the curve of the cam surface CF and transmits the horizontal force to the shifting unit SU and the parking unit PU as driving forces.

The cam surface CF is symmetrically formed on the exterior circumference of the cam block 35, with respect to a line on the cam block 35. The cam surface CF forms ranges of a neutral range N, a first shift-stage range D1, and a second shift-stage range D2 in connection with the shifting unit SU, and forms ranges of a parking range P and a parking release range NP in connection with the parking unit PU.

The cam surface CF may be formed in a profile such that the parking unit PU stays in the parking range P while the shifting unit SU stays in the neutral range N, and the parking unit PU stays in the parking release range NP while the shifting unit SU stays in the first shift-stage range D1 or the second shift-stage range D2.

The shifting unit SU includes a fork slider 5, a shift fork 3, a cam contact pin 7, and a fork return spring RS1.

The fork slider 5 is slidably mounted on a fork rail 1 fixed to a transmission housing (not shown).

The shift fork 3 is integrally formed in a lower part of the fork slider 5 slidable along the fork rail 1, and enables synchronizer operation. The shift fork 3 is connected to the sleeve (not shown) of the synchronizer (not shown) for shifting to the first shift-stage and the second shift-stage.

The cam contact pin 7 is integrally formed in an upper part of the fork slider 5, and maintains contact with the cam surface CF formed on the exterior circumference of the cam block 35.

The fork return spring RS1 is formed as a coil spring mounted around the fork rail 1. One end of the fork return spring RS1 is supported by a fixture such as the transmission housing (not shown), and another end of the fork return spring RS1 elastically abuts the fork slider 5 toward the cam block 35, such that the cam contact pin 7 may maintain contact with the cam surface CF of the cam block 35.

The parking unit PU includes a parking gear 33 installed on an output shaft or an intermediate shaft in a transmission, a parking sprag 31, a parking lever 37, and a parking rod 39.

The parking sprag 31 includes an engagement end 31a protruding from the parking sprag 31 and engaged with teeth of the parking gear 33, and the parking sprag 31 is disposed such that the engagement end 31a may face the parking gear 33. The parking sprag 31 is fixed to a sprag shaft 41.

A sprag return spring RS2 mounted around the sprag shaft 41 always acts an elastic force on the parking sprag 31 in a parking release direction.

The parking lever 37 is rotatably mounted on the lever shaft 43 fixed to the transmission housing (not shown), and maintains contact with the cam surface CF of the cam block 35 by a sprag return spring RS3 mounted around the lever shaft 43.

A cam portion 39a is formed on the parking rod 39 at a location corresponding to a front end of the parking sprag 31, and a rear end of the parking rod 39 is connected to a bottom end of the parking lever 37.

When the parking lever 37 rotates around an axis of the lever shaft 43, the parking rod 39 is horizontally operated. In this case, the cam portion 39a of the parking rod 39 presses an end of the parking sprag 31 that is rotatable around an axis of the sprag shaft 41, such that the engagement end 31a is engaged with the parking gear 33. The cam portion 39a is provided with a conical lateral surface to enable smooth rotation of the parking sprag 31 when the parking rod reciprocates.

FIG. 3 to FIG. 4 respectively illustrate an operation state of a gear shifting apparatus for a multi-speed transmission for an electric vehicle according to an exemplary form of the present disclosure.

Hereinafter, with reference to FIG. 3 to FIG. 4, operation of a gear shifting apparatus according to an exemplary form of the present disclosure is described.

According to a gear shifting apparatus according to an exemplary form of the present disclosure, a control motor M controls both the shifting unit SU and the parking unit PU.

The control motor M drives the cam block 35 by a reduction ratio through the driven gear PG externally gear-meshed with the drive gear DG. Thereby, gear shifting is controlled through the shift fork 3 on the shift rail 1, and at the same time, engagement and disengagement of the parking gear 33 with the parking sprag 31 is also controlled.

Referring to FIG. 1, FIG. 3, and FIG. 4, an operation of the form is described with respect to the parking stage, the first shift-stage, and the second shift-stage.

[Parking Stage]

Referring to FIG. 1, in the parking stage, a top end of the parking lever 37 contacts the parking range P of the cam surface CF on the cam block 35 driven by the control motor M, by the elastic force of the lever return spring RS3.

In this case, the parking rod 39 is located in a forward position to the right side in FIG. 1. In this case, the cam portion 39a of the parking rod 39 presses the end of the parking sprag 31, and the engagement end 31a of the parking sprag 31 is engaged with parking gear 33. Therefore, the parking gear 33 becomes fixed in the rotating direction, and the parked stage is achieved.

In addition, the cam contact pin 7 maintains contact with the neutral range N of the cam surface CF on the cam block 35. In this state, the shift fork 3 is located in the neutral position on the fork rail 1, and thereby, the sleeve (not shown) of the synchronizer (not shown) for shifting to the first shift-stage and the second shift-stage is located to the neutral position.

[First Shift-Stage]

Referring to FIG. 3, in the first shift-stage, the cam block 35 is rotated by the control motor M. Thereby, the top end of the parking lever 37 escapes from the parking range P of the cam surface CF, and moves to the parking release range NP, while rotating about an axis of the lever shaft 43.

In this case, the parking rod 39 moves backward from the parking sprag 31 by the rotation of the parking lever 37. Accordingly, the cam portion 39a of the parking rod 39 escapes from the parking sprag 31, and thereby the engagement of the parking gear 33 with the parking sprag 31 is released. Therefore, the parking gear 33 may freely rotate, and thereby, the parking stage is released.

At the same time, by the rotation of the cam block 35 driven by the control motor M, the cam contact pin 7 contacts the first shift-stage range D1 in the cam surface CF of the cam block 35.

In this case, the shift fork 3 moves to a first shift-stage position on the fork rail 1, and therefore, the first shift-stage is achieved by moving the sleeve (not shown) of the synchronizer (not shown) for shifting to the first shift-stage and the second shift-stage to the first shift-stage position.

[Second Shift-Stage]

Referring to FIG. 4, in the second shift-stage, the cam block 35 further rotates by the control motor M from the state of the first shift-stage, and the cam contact pin 7 contacts the second shift-stage range D2 in the cam surface CF of the cam block 35.

In this case, the shift fork 3 moves to a second shift-stage position on the fork rail 1, and therefore, the first shift-stage is achieved by moving the sleeve (not shown) of the synchronizer (not shown) to the first shift-stage, and the second shift-stage is by moving to the second shift-stage position.

While the cam block 35 further rotates by the control motor M, the parking lever 37 maintains the contact with the parking release range NP of the cam surface CF by the elastic force of the lever return spring RS3, and therefore, the parking release state is maintained.

According to a gear shifting apparatus according to an exemplary form of the present disclosure, in a multi-speed transmission of an electric vehicle, actuators of the shifting unit SU and the parking unit PU is simplified as a control motor M while enabling control of first and second shift-stages and a parking stage, thereby realizing simplified structure, a cost reduction due to less number of required parts, and a weight reduction.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

| M: control motor | SU: shifting unit |
| --- | --- |
| PU: parking unit | 1: fork rail |
| 3: shift fork | 5: fork slider |
| 7: cam contact pin | 31: parking sprag |
| 31a: engagement end | 33: parking gear |
| 35: cam block | 37: parking lever |
| 39: parking rod | 39a: cam portion |
| 41: sprag shaft | 43: lever shaft |

What is claimed is:

1. A gear shifting apparatus for a multi-speed transmission for an electric vehicle, comprising:
    a shifting unit configured to control gear shifting by a torque of an actuator; and
    a parking unit including a parking gear and configured to control controlling engagement and disengagement of the parking gear by the torque of the actuator,
    wherein the actuator comprises a control motor configured to transmit a driving torque to a driven gear through a drive gear externally gear-meshed with the driven gear,
    wherein the shifting unit and the parking unit are operated by a force received from a cam block fixed with the driven gear at a rotation center of the driven gear;
    wherein the shifting unit comprises:
        a fork slider slidably mounted on a fork rail;
        a shift fork integrally formed with the fork slider and activating the gear shifting; and
        a cam contact pin integrally formed with the fork slider and contacting the cam block.

2. The gear shifting apparatus of claim 1, wherein the parking unit further comprises:

a parking sprag having a first end facing the parking gear, and configured to rotate about an axis of a sprag shaft and to abut toward a parking release direction;

a parking lever rotatably mounted on a lever shaft and abutted to maintain contact with a cam surface formed on an exterior circumference of the cam block; and a parking rod connected to a bottom portion of the parking lever and having a cam portion interacting with a second end of the parking sprag distal to the sprag shaft.

3. The gear shifting apparatus of claim 2, wherein a speed reduction is achieved when the torque of the control motor is transmitted from the drive gear to the driven gear.

4. The gear shifting apparatus of claim 2, wherein the cam surface is formed along an exterior circumference of the cam block, and includes a neutral range, a first shift-stage range, and a second shift-stage range with respect to the shifting unit, and wherein the cam surface further includes a parking range and a parking release range with respect to the parking unit.

5. The gear shifting apparatus of claim 4, wherein the cam surface is formed in a profile such that the parking unit stays in the parking range while the shifting unit stays in the neutral range, and wherein the parking unit stays in the parking release range while the shifting unit stays in the first shift-stage range or the second shift-stage range.

6. The gear shifting apparatus of claim 2, wherein the parking lever rotates at an axis of the lever shaft and thereby horizontally operates the parking rod.

7. The gear shifting apparatus of claim 2, wherein the cam portion of the parking rod presses the second end of the parking sprag to force the first end of the parking sprag to engage with the parking gear.

8. A gear shifting apparatus for a multi-speed transmission for an electric vehicle, comprising:

a shifting unit configured to control gear shifting by a torque of an actuator; and a parking unit including a parking gear and configured to control engagement and disengagement of the parking gear by the torque of the actuator, wherein the actuator comprises a control motor transmitting a driving torque to a driven gear of the shifting unit and the parking unit through a drive gear externally gear-meshed with the driven gear, wherein the shifting unit and the parking unit are controlled by a force of a cam block connected to a rotation center of the driven gear, and the cam block has a cam surface comprising: a neutral range, a first shift-stage range, a second shift-stage range, a parking range, and a parking release range, wherein the parking unit further comprises:

a parking sprag having a first end facing the parking gear and configured to rotate about an axis of a sprag shaft, and to abut toward a parking release direction by a sprag return spring;

a parking lever rotatably mounted on a lever shaft and abutted by a lever return spring to maintain contact with the cam surface of the cam block; and a parking rod connected to a bottom portion of the parking lever and having a cam portion interacting with a second end of the parking sprag distal to the sprag shaft.

9. The gear shifting apparatus of claim 8, wherein a speed reduction is achieved when the torque of the control motor is transmitted from the drive gear to the driven gear.

10. The gear shifting apparatus of claim 8, wherein the parking lever rotates at an axis of the lever shaft and thereby horizontally operates the parking rod.

11. The gear shifting apparatus of claim 8, wherein the cam portion of the parking rod presses the second end of the parking sprag to force the first end of the parking sprag to engage with the parking gear.

12. The gear shifting apparatus of claim 8, wherein the shifting unit comprises:

a fork slider slidably mounted on a fork rail;

a shift fork integrally formed with the fork slider and activating the gear shifting;

a cam contact pin integrally formed with the fork slider and contacting the cam surface of the cam block; and a fork return spring mounted around the fork rail and configured to abut the fork slider toward the cam block.

13. The gear shifting apparatus of claim 8, wherein the cam surface is formed in a profile such that the parking unit stays in the parking range while the shifting unit stays in the neutral range, and the parking unit stays in the parking release range while the shifting unit stays in the first shift-stage range or the second shift-stage range.

* * * * *